United States Patent [19]

Nabeshima et al.

[11] Patent Number: 4,623,994

[45] Date of Patent: Nov. 18, 1986

[54] SCANNING SERVO SYSTEM FOR OPTICAL-DISC INFORMATION REPRODUCING APPARATUS

[75] Inventors: Daiki Nabeshima, Kamakura; Hiroshi Nakane, Yokohama, both of Japan

[73] Assignee: Tokyo Shibaura Denki Kabushiki Kaisha, Japan

[21] Appl. No.: 489,770

[22] Filed: Apr. 29, 1983

[30] Foreign Application Priority Data

Apr. 30, 1982 [JP] Japan .................................. 57-72741

[51] Int. Cl.$^4$ .......................... G11B 7/00; G11B 21/10
[52] U.S. Cl. ......................................... 369/44; 369/32; 369/33; 369/45; 369/54; 369/58; 250/201
[58] Field of Search .................... 369/43, 44, 45, 46, 369/32, 33, 41, 54, 58; 250/201 DF; 358/342, 314, 336

[56] References Cited

U.S. PATENT DOCUMENTS 3,474,418 10/1969 Jensen .
4,406,000 9/1983 Shoji et al. ............................ 369/44
4,414,655 11/1983 Shoji et al. ............................ 369/44
4,446,545 5/1984 Dijk ....................................... 369/44

FOREIGN PATENT DOCUMENTS

0062465 10/1982 European Pat. Off. .
53-149003 12/1978 Japan .
2029051 3/1980 United Kingdom .

Primary Examiner—Robert L. Richardson
Attorney, Agent, or Firm—Finnegan, Henderson, Farabow, Garrett & Dunner

[57] ABSTRACT

A scanning servo system, that is, a focusing servo system or a tracking servo system, for an optical-disc information reproducing apparatus includes (a) a light source for generating a light beam to scan a selected track location on an optical-disc wherein the information is stored as a series of pits arranged in the form of the track; (b) an objective lens for applying a scanning spot of the light beam to the selected track location; (c) a transducer for converting an optical signal or an image of the pit into an electric signal; (d) an actuator for driving the objective lens in response to the electric signal in a direction vertical or radial to the optical-disc, thereby causing the scanning spot to scan the selected track location accurately, the actuator being variable in its response characteristics in response to the electric signal; (e) a circuit for detecting a dropout of the information on the selected track location and generating a responsive signal to the dropout of information; (f) a circuit for delaying the responsive signal to the dropout of information for one rotation period of the optical-disc; and (g) a circuit for lowering the response characteristics of the actuator in response to the responsive signal to the dropout of information through the delaying circuit.

15 Claims, 18 Drawing Figures

SCANNING SERVO SYSTEM FOR OPTICAL-DISC INFORMATION REPRODUCING APPARATUS

FIELD OF THE INVENTION

The invention relates to a scanning servo system and, more particularly, to a scanning servo system for an optical-disc information apparatus.

BACKGROUND OF THE INVENTION

In an optical-disc of the type presently used with a DAD (Digital Audio Disc) player or a video disc player, audio or video information is recorded in optically coded form as a series of recesses or pits formed in the information carrying face of the optical-disc and arranged in either a single spiral track or a plurality of concentric tracks about the center axis of the optical-disc. The audio or video information thus recorded is reproduced by optically scanning the individual recesses or pits along the spiral track or the concentric tracks by means of a convergent spot developed from a laser light beam which is utilized to detect the lengths and spacings between the scanned recesses or pits. During reproduction, the optical-disc is usually rotated about the center axis thereof at a constant linear velocity (CLV) or a constant angular velocity (CAV), and the convergent spot of the laser light beam is displaced radially relative to the optical-disc by a tracking device or a pick-up unit which is a part of the DAD or video disc player. The laser beam is directed to a selected track location and reflected by the information carrying face of the optical-disc or is passed through the optical-disc. The beam of light thus reflected by or passed through the optical-disc is then converted into an electric signal by means of a photoelectric transducer mounted on the pick-up unit so as to facilitate further conversion into an audio or video signal.

In order to reproduce the information recorded on the optical-disc, the convergent spot of the laser light beam must be precisely applied to the selected track location on the optical-disc. To this end, it is known to employ a method in optical-disc information reproducing apparatus wherein a light beam, exclusively used for scanning, is generated separately from the light beam used for reproducing the audio or video information signal, with a photoelectric transducer being used for detecting the scanning light beam and effect scanning control. Another method employed involves extracting the audio or video information signal and the scanning signal all with a single light beam.

According to the latter method, the photoelectric transducer includes a plurality of photodetecting units, for example, four units. An image of the pit reflected by the single light beam is converted into respective electric signals by the four photodetecting units. The signals from the four photodetecting units are then converted into signals carrying audio or video information, focusing error information and tracking error information. The scanning error information, that is, the focusing error information signal and tracking error information signal thus detected, are introduced into a focusing actuator and a tracking actuator for driving an objective lens mounted on the pick-up unit vertically and radially relative to the optical-disc so as to direct the convergent spot to the selected track location accurately. A focusing actuator and a tracking actuator together comprise a scanning servo for the convergent spot of the laser light beam.

Generally, the focusing actuator and the tracking actuator must have relatively high response characteristics to make the convergent spot strictly follow quick fluctuations of the selected track location typical during reproduction conditions. However, when dropouts occur in the focusing error information signal or the tracking error information signal due to dust or scars on the optical-disc, the focusing actuator and the tracking actuator mistakingly cause the convergent spot to jump from the correct track location. Because the servo system is apt to become out of control when these signals are in error for more than a certain time, the allowable time for signal dropout varies according to the response characteristics of the servo system. That is, the allowable dropout time is shorter in a servo system with high response characteristics, and is longer in a servo system with low response characteristics. By lowering the response characteristics, malfunctioning of the scanning servo can be prevented. Conventional focusing and tracking actuator systems have therefore been designed which vary their response characteristics upon detection of information dropout.

Scanning servo systems employed to date have several drawbacks, however. The convergent spot is still apt to jump from the selected track location because the focusing actuator and the tracking actuator fail to vary their response characteristics during the short period at the leading portion of each information dropout. If this drawback is prevented by downgrading the higher response characteristics of the focusing actuator and the tracking actuator, the conventional scanning servo system has another drawback in that the focusing actuator and the tracking actuator then fail to make the convergent spot follow quick fluctuations of the selected track location caused by, for example, a mechanical shock to the DAD or video disc player.

SUMMARY OF THE INVENTION

It is, therefore, an object of the present invention to provide an optical-disc information reproducing apparatus performing precise scanning control of a convergent spot of laser light beam along a selected track location, even in the event of information dropout.

According to the present invention, a scanning servo system for an optical-disc information reproducing apparatus in which information stored in an optical-disc as a series of recesses or pits arranged in concentric tracks or in a single spiral track is read out during rotation of the optical-disc by a scanning convergent spot of a light beam, comprises a light source for generating the light beam used for reading out the information as an optical signal; means for applying the scanning convergent spot of the light beam to a selected track location; a photoelectric transducer for converting the optical signal into an electric signal; means for controlling the scanning convergent spot applying means in response to the electric signal, thereby causing the scanning convergent spot to scan the selected track location accurately, the response characteristics of the controlling means being variable in response to the electric signal; means for detecting a dropout of the information on the selected track location and generating a responsive signal to the dropout of information; means for delaying the responsive signal to the dropout of information for one rotation period of the optical-disc; and means for lowering the response characteristics of the controlling means in response to the delayed responsive signal to the dropout of information.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

FIGS. 4(a) thru 4(h) are timing diagrams showing various waveforms appearing in the circuit arrangements of FIGS. 1 and 3;

DESCRIPTION OF THE PREFERRED EMBODIMENTS

The present invention will now be described in detail with reference to FIGS. 1 to 11. Throughout the drawings, like reference numerals or letters are used to designate like or equivalent elements.

Figure 1:
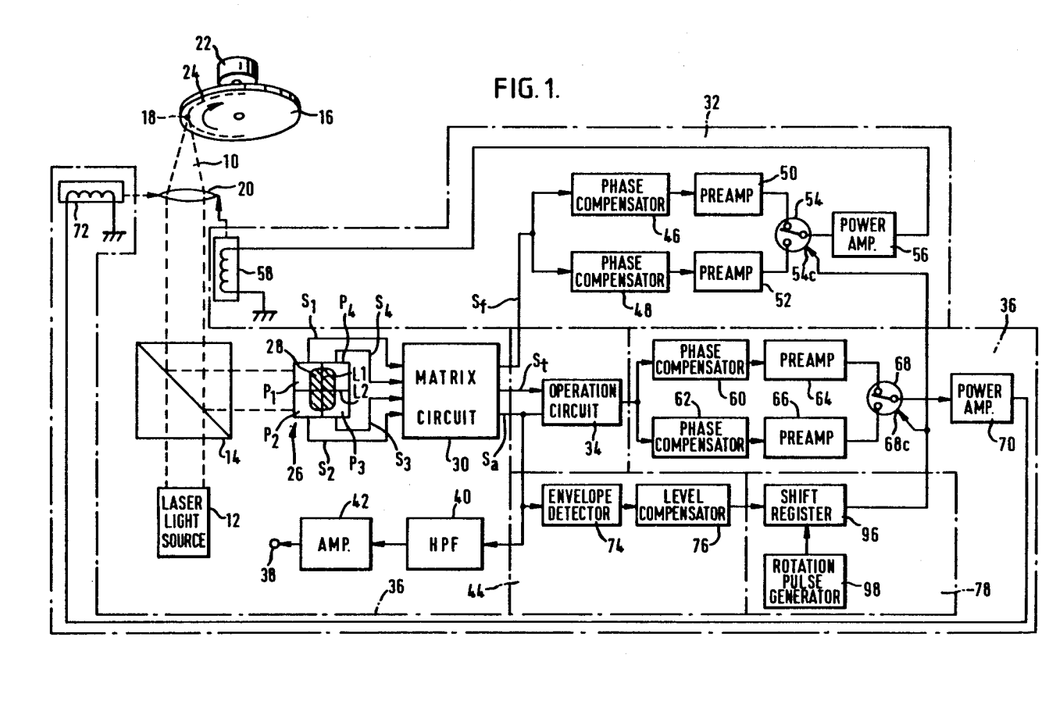
FIG. 1 is a block diagram of a preferred embodiment of an optical-disc information reproducing apparatus according to the present invention.
Figure 2:
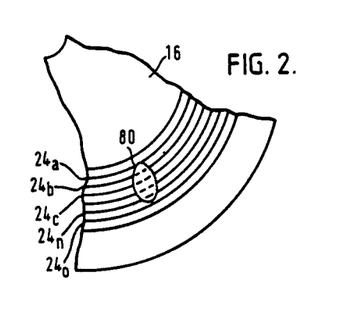
FIG. 2 is a partial view of an optical-disc in which some number of track locations adjacent to each other are covered with dust or scars.

Referring first to FIGS. 1 and 2, description will be made of a fundamental circuit arrangement of an optical-disc information reproducing apparatus embodying the present invention. In FIG. 1, parts which are not relevant to control of the apparatus are omitted from the illustration. A light beam 10 emerging from a laser light source (such as a He-Ne laser) 12 passes through a beam splitter 14. Beam 10 converges at a point on an optical-disc 16, termed the convergent spot 18, by means of an objective lens 20. Optical-disc 16, that is, the DAD or the video disc, is rotated at a constant linear velocity (CLV) by the DAD player or at a constant angular velocity (CAV) by the video disc player via a motor 22. A single spiral track or a plurality of concentric tracks 24 is provided on optical-disc 16 bearing information relating to audio signals or video signals, etc., which have been recorded in coded form at high density. This optically stored information is read out by scanning the single spiral track or the concentric tracks 24 on optical-disc 16 through manipulation of convergent spot 18.

At convergent spot 18 of light beam 10, the information on a selected track location 24 is read in the form of changes in the reflection factor of light beam 10 due to the recesses or pits representing the coded information of the audio or video signal. The reflected light beam returns to objective lens 20 and is separated from the entrance beam by beam splitter 14. The reflected light beam 10 is then guided to a photoelectric transducer 26 so that light beam 10, having reached photoelectric transducer 26, becomes a detector spot bearing image 28 of the pit.

Photoelectric transducer 26 is divided into four individual photodetection portions corresponding to four regional elements P1, P2, P3 and P4, which are divided by a boundary line L1 longitudinal to an image of the tracking direction, and by a boundary line L2 perpendicular to the image of the tracking direction. Pit image 28 is placed on or displaced from longitudinal line L1 according, respectively, to whether convergent spot 18 is accurately or inaccurately scanning tracking information from the selected track location 24. Pit image 28 is also placed on or displaced from perpendicular line L2 according, respectively, to whether convergent spot 18 is accurately or inaccurately scanning focusing information from the selected track location 24. Individual photodetection elements P1, P2, P3 and P4 output electric signals S1, S2, S3 and S4, respectively, which vary according to the areas of elements P1, P2, P3 and P4 overlapped by pit image 28.

Signals S1, S2, S3 and S4 are matrixed by a matrix circuit 30 and then differently combined to form three signals: audio or video information carrying signal Sa, tracking information carrying signal St, and focusing information carrying signal Sf. Signal Sa is the sum of all of detection signals S1 to S4. Signal St is the difference of two subcombinations, namely, the sum of detection signals S1 and S3 from elements P1 and P3 minus the sum of detection signals S2 and S4 from elements P2 and P4. Elements P1 and P3 are orthogonal to each other and thus form a combination obliquely disposed to the track image. Elements P2 and P4 are also orthogonal to each other and thus form another combination obliquely disposed to the track image. Signal Sf is the difference of two subcombinations, namely, the sum of detection signals S1 and S2 from elements P1 and P2 minus the sum of detected signals S3 and S4 from elements P3 and P4.

Focusing information carrying signal Sf is applied to a focusing control section 32 and is used to develop a focusing error signal. Tracking information carrying signal St is applied to an operation circuit 34 together with audio or video information carrying signal Sa. Operation circuit 34 compares the phases of tracking information carrying signal St with audio or video information carrying signal Sa and generates a tracking error signal Ste. Tracking error signal Ste may also be generated from only tracking information carrying signal St, as disclosed closed in U.S. Pat. No. 4,520,464, issued May 28, 1985 and owned by a common assignee. Tracking error signal Ste from operation circuit 34 is applied to a tracking control section 36.

Audio or video information carrying signal Sa is further applied through a high pass filter 40 and an amplifier 42 to an output terminal 38, and is used for audio or video signal reproduction. Audio or video information carrying signal Sa is also applied to an information dropout detecting section 44 for detecting dropout of audio or video information signal Sa while convergent spot 18 is scanning the selected track location 24, and for generating a signal D in response to the dropout of information. Signal D is applied to focusing control section 32 and tracking control section 36 to vary the response characteristics thereof by means of focusing error signal Sfe and tracking error signal Ste.

Focusing control section 32 includes a pair of phase compensators 46 and 48 connected to matrix circuit 30 and in parallel with each other; high gain and low gain preamplifiers 50 and 52, respectively, connected in series to phase compensators 46 and 48, respectively; a selector switch 54 connected between preamplifiers 50 and 54; a power amplifier 56 connected to selector switch 54; and an actuator 58 connected to power amplifier 56 for driving objective lens 20 so as to move convergent spot 18 in a vertical direction relative to optical-disc 16.

Tracking control section 36 includes a pair of phase compensators 60 and 62 connected to operation circuit 34 and in parallel with each other; high gain and low gain preamplifiers 64 and 66, respectively, connected in series to phase compensators 60 and 62, respectively; a selector switch 68 connected between preamplifiers 64 and 66; a power amplifier 70 connected to selector switch 68; and an actuator 72 connected to power amplifier 70 for driving objective lens 20 so as to move convergent spot 18 in a radial direction relative to optical-disc 16.

Phase compensators 46 and 48 in focusing control section 32 and phase compensators 60 and 62 in tracking control section 36 change the frequency-to-phase characteristics of focusing control section 32 and tracking control section 36, respectively, suitable for their high or low response characteristics.

Information dropout detecting section 44 includes an envelope detector 74 connected to matrix circuit 30 and a level comparator 76 connected to envelope detector 74. Signal D, responsive to the dropout of information, that is, an output of information dropout detecting section 44, is applied to control terminals 54c and 68c of selector switches 54 and 68 through a delay section 78 which delays responsive signal D for one rotation period of optical-disc 16.

The operation of a focusing servo and a tracking servo for convergent spot 18 will now be explained with reference to FIGS. 1, 2 and 4. When dust or a scar 80 clings to or is made on a surface of optical-disc 16, as shown in FIG. 2, a number of tracks 24a, 24b, 24c . . . 24n adjacent each other are covered along some of their length by the dust or scar 80. In FIG. 2, the respective tracks are drawn with large gaps therebetween for the sake of explanation, but it should be appreciated that the tracks on an actual DAD or video disc are arranged with very high density. Accordingly, when convergent spot 18 scans tracks 24a, 4b, 24c . . . 24n in turn, photoelectric transducer 26 fails to detect the information on the parts of the tracks which are covered by dust or scar 80.

Figure 4:
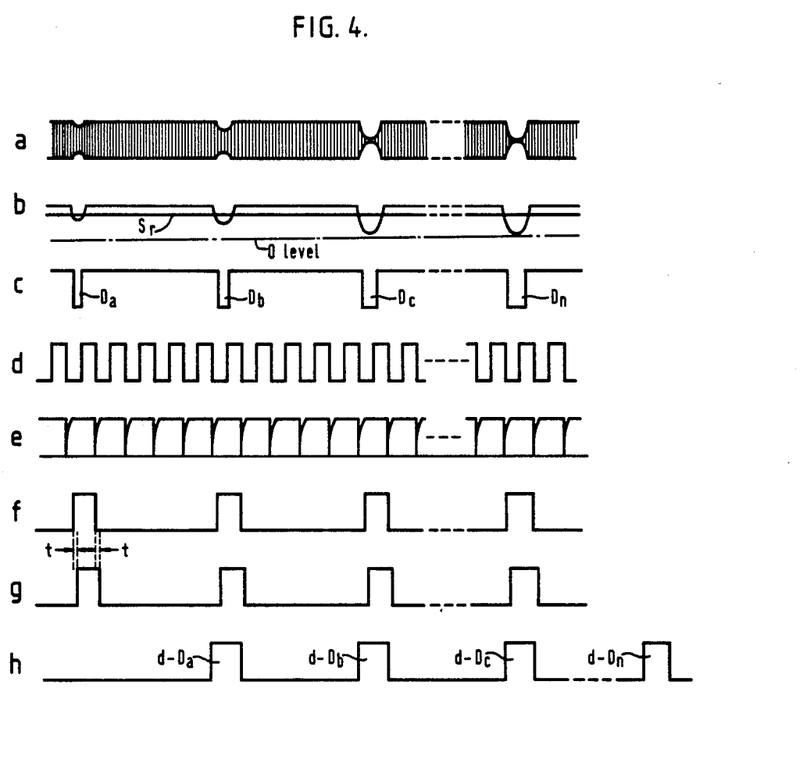

In the case described above, audio or video information carrying signal Sa from matrix circuit 30 has a waveform a as shown in FIG. 4. The positive and negative amplitudes of signal Sa are decreased for every transit time of dust or scar 80 along the parts of tracks 24a, 24b, 24c . . . 24n. Transit time as used herein means the time required for convergent spot 18 to move along the selected track completely through dust or scar 80. One of the envelopes, for example, the positive envelope of waveform a, is detected by envelope detector 74 so that a signal with a waveform b as shown in FIG. 4 is applied by envelope detector 74 to level comparator 76. The signal with waveform b is compared with a reference level signal Sr present in level comparator 76. A pulse train c, as shown in FIG. 4, is then generated from level comparator 76. Pulse train c has responsive pulse signals Da, Db, Dc . . . Dn corresponding to the dropouts of information and having pulse widths corresponding to the transit times of dust or flaw 80 along tracks 24a, 24b, 24c . . . 24n. Pulse signals Da, Db, Dc . . . Dn occur in every rotation of optical-disc 16 in which dropouts of information from tracks 24a, 24b, 24c . . . 24n occur due to dust or scar 80. Each pulse signal Da, Db, Dc . . . Dn is applied, in turn, to delay section 78.

In delay section 78, each responsive pulse signal Da, Db, Dc . . . Dn is increased to a predetermined pulse width or period and is delayed by one rotation of optical-disc 16. Delayed responsive pulse signals d-Da, d-Db, d-Dc . . . d-Dn are arranged in a pulse train h, as shown in FIG. 4, and applied to control terminals 54c and 68c of selector switches 54 and 68, respectively. Selector switches 54 and 68 connect low gain preamplifiers 52 and 66 to power amplifiers 56 and 70, respectively, in response to delayed pulse signals d-Da, d-Db, d-Dc . . . d-Dn responsive to the dropouts of information. Otherwise, selector switches 54 and 68 normally connect high gain preamplifiers 50 and 64 to power amplifiers 56 and 70, respectively.

During connection of low gain preamplifiers 50 and 66 to power amplifiers 56 and 70 due to delayed responsive pulse signals d-Da, d-Db, d-Dc . . . d-Dn, focusing control section 32 and tracking control section 36 are altered to have relatively low response characteristics in view of their low gain conditions. Focusing control section 32 and tracking control section 36 are then maintained with low response characteristics for predetermined periods corresponding to the transit times of dust or scar 80 along tracks 24b, 24c, . . . 24n so that focusing actuator 58 and tracking actuator 72 are prevented from making convergent spot 18 of light beam 10 erroneously jump from the selected track location 24a, 24b, 24c . . . 24n.

As to the first track 24a of the tracks covered by dust or scar 80, focusing control section 32 and tracking control section 36 are maintained with the high response characteristics, i.e. low gain preamplifiers 52 and 66 are not connected to power amplifiers 56 and 70. As to track 24a, the transit time of dust or scar 80 is limited to a very short period, much less than the allowable time of the focusing servo system and the tracking servo system even with the high response characteristics, because end portions of typical dust or scars are narrow. Therefore, the first track 24a of the tracks covered by dust or scar 80 has only a short portion covered by the dust or scar 80 so that focusing actuator 58 and tracking actuator 72 are able to make convergent spot 18 of light beam 10 continue to follow the covered part of track 24a accurately.

On the other hand, focusing control section 32 and tracking control section 36 are changed to low response characteristics in response to delayed responsive pulse signal d-Dn during reproduction of a track 24o next to the last track 24n of the tracks covered by dust or scar 80. As to track location 24o, focusing control section 32 and tracking control section 36 are still operated at the low response characteristics during only the short period corresponding to the predetermined pulse width of delayed responsive pulse signal d-Dn so that any chance of a disturbance being suffered in the operations of focusing control section 32 and tracking control section 36 during such a short period may be almost entirely disregarded.

Figure 3:
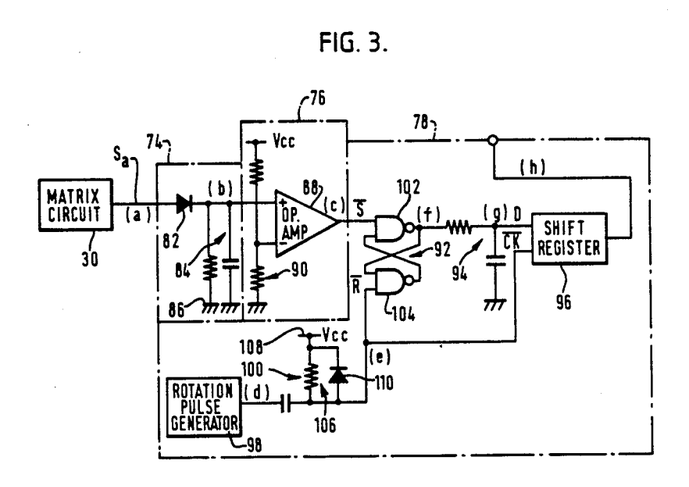
FIG. 3 is a block diagram showing in detail the delay section of the circuit arrangement of FIG. 1.

Referring now to FIGS. 3 and 4, a presently preferred embodiment of a circuit for information dropout detecting section 44 and delay section 78 of FIG. 1 is described in detail. In FIG. 3, envelope detector 74 includes a rectifier or diode 82 connected between the output terminal of matrix circuit 30 (FIG. 1) for audio or video information carrying signal Sa and the input terminal of level detector 76, and a smoothing circuit 84 connected between the cathode of diode 82 and a reference potential source 86. In envelope detector 74 thus formed, audio or video information carrying signal Sa, having a waveform a as shown in FIG. 4, is rectified and then smoothed so that the positive envelope signal with waveform b as shown in FIG. 4 is obtained on an output terminal thereof. The envelope signal with waveform b is applied to level comparator 76. Level comparator 76 includes an operational amplifier 88 with its non-inverting input terminal connected to the output terminal of envelope detector 74, and a reference level signal source 90 connected to its inverting input terminal. Thus, in level comparator 76 thus formed, the positive envelope signal with waveform b from envelope detector 74 is applied to the non-inverting input terminal of operational amplifier 88 and is compared with reference level signal Sr applied from reference level signal source 90 to the inverting input terminal of operational amplifier 88. Pulse train c having responsive pulse signals Da, Db, Dc . . . Dn, as shown in FIG. 4, is produced at an output terminal of operational amplifier 88.

Pulse train c with responsive pulse signals Da, Db, Dc . . . Dn is applied to delay section 78. Delay section 78 includes a flip-flop 92, a phase-lag circuit 94, a shift register 96, a rotation pulse generator 98 responsive to the rotation speed of optical-disc 16 and a trailing edge detector 100. Flip-flop 92 may comprise two NAND gates 102 and 104 in a known fashion. One input terminal of NAND gate 102, corresponding to a SET input terminal of flip-flop 92, receives information dropout responsive pulse signals Da, Db, Dc . . . Dn from level comparator 76. On the other hand, rotation pulse generator 98 is reponsive to the rotation of optical-disc 16 and generates a pulse train d, as shown in FIG. 4, having a predetermined integer number of pulses, for example, seventy-two (72) pulses per one rotation of optical-disc 16. Pulse train d is applied to trailing edge detector 100. Trailing edge detector 100 may comprise differentiation circuit 106 including a positive reference potential source 108 and a diode 110 connected in the reverse direction between an output terminal of differentiation circuit 106 and positive reference potential source 108. This arrangement produces a pulse train e having pulses adjoining each other and occurring coincidentally with the trailing edge of the pulses of pulse train d from rotation pulse generator 98, as shown in FIG. 4.

Pulse train e is applied to one input terminal of NAND gate 104, corresponding to a RESET input terminal of flip-flop 92. A pulse train f, as shown in FIG. 4, is then produced at an output terminal of NAND gate 102, corresponding to an output terminal of flip-flop 92. Pulses in pulse train f have leading edges coincident with the leading edges of corresponding responsive pulse signals Da, Db, Dc . . . Dn in pulse train c.

The trailing edges of the pulses in pulse train f are coincident with the trailing edges of those pulses in pulse train e which are applied to flip-flop 92 concurrently with respective responsive pulse signals Da, Db, Dc . . . Dn in pulse train c. In the case of a responsive pulse signal in pulse train c extending to two or more pulses in pulse train e, a corresponding pulse in pulse train f has a trailing edge coincident with the trailing edge of the last pulse of the two or more pulses in pulse train e.

Pulse train f thus produced is applied to phase-lag circuit 94 which may be formed of an integrating circuit. In phase-lag circuit 94, respective pulses in pulse train g are lagged by a predetermined period t from those in pulse train f. A pulse train g with the lagged pulses as shown in FIG. 4 appears on an output terminal of phase-lag circuit 94 and is applied to a D input terminal of shift register 96. On the other hand, pulse train e on the output terminal of trailing edge detector 100 is applied to a CK input terminal of shift register 96. Shift register 96 is comprised of the same number of register units or flip-flops as the integer number, for example, seventy-two (72), described above with reference to rotation pulse generator 98. Therefore, the respective pulses in pulse train g are sequentially applied to the D input terminal of shift register 96 and then shifted in response to every application of the pulses in pulse train e to the CK input terminal of shift register 96. Pulse train h, as described before, thus appears on an output terminal of shift register 96. That is, delayed responsive pulse signals d-Da, d-Db, d-Dc . . . d-Dn respectively appear when the predetermined integer number of pulses in pulse train e have been applied to the CK input terminal of shift register 96 after the pulses in pulse train g, which correspond to responsive pulse signals Da, Db, Dc . . . Dn in pulse train c, have been applied to the D input terminal of shift register 96. In other words, delayed responsive pulse signals d-Da, d-Db, d-Dc . . . d-Dn appear on the output terminal of shift register 96 in pulse train h after one rotation of optical-disc 16 from the point at which responsive pulse signals Da, Db, Dc . . . Dn occurred in pulse train c due to the dropout of information.

Delayed responsive pulse signals d-Da, d-Db, d-Dc . . . d-Dn in pulse train h have a predetermined width wider than that of corresponding responsive pulse signals Da, Db, Dc . . . Dn in pulse train c. Further, the potential on the output terminal of shift register 96 or the Q output terminal of the last stage flip-flop of shift register 96 turns to a high potential state or a low potential state at a time when the leading edge of a certain pulse in pulse train e has been applied to the CK input terminal of shift register 96. Therefore, respective responsive pulse signal d-Da, d-Db, d-Dc . . . d-Dn are able to maintain focusing control section 32 (FIG. 1) and tracking control section (FIG. 1) with the low response characteristics for periods more than the transit periods of dust or scar 80 along tracks 24b, 24c, etc.

The widths of delayed responsive pulse signals d-Da, d-Db, d-Dc . . . d-Dn are each equal to the period that optical-disc 16 rotates by 5 degrees in angle, presuming rotation pulse generator 98 generates seventy-two pulses per one rotation of optical-disc 16. Rotation pulse generator 98 is able to generate the pulses by various conventional methods, for example, by detecting a frequency component in the reverse voltage of the motor used for driving optical-disc 16 by detecting commutation sparks of the DC motor for driving optical-disc 16 by detecting a pattern of radial stripes formed on a disc rotating together with optical-disc 16, by detecting a sync signal recorded together with the audio or video information signal in optical-disc 16 of the type of CAV, etc.

Figure 5:
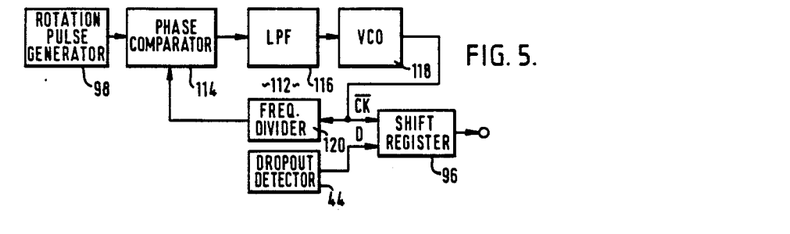
FIG. 5 to FIG. 10 are block diagrams showing modifications of the circuit arrangement of FIG. 3.

Referring now to FIGS. 5 to 11, a number of modifications of the circuit of FIG. 3 will now be explained. In FIG. 5, shift pulses for shift register 96 are applied from rotation pulse generator 98 through a phase-locked loop (PLL) 112. Rotation pulse generator 98 generates a small, integer number of pulses, for example, one pulse per one rotation of optical-disc 16 (not shown). The pulses from rotation pulse generator 98 are applied to PLL 112. PLL 112 includes a phse comparator 114 having an input terminal connected to rotation pulse generator 98; a low pass filter (LPF) 116 having its input terminal connected to phase comparator 114; a voltage controlled oscillator (VCO) 118 having its input terminal connected to LPF 116; and a frequency divider 120 having its input terminal connected to VCO 118 and its output terminal connected to another input terminal of phase comparator 114. An output terminal of VCO 118 is also connected to the CK input terminal of shift register 96. Information drop-out detecting section 44 is connected to the D input terminal of shift register 96.

Frequency divider 120 divides pulses in a pulse train applied from VCO 118 so that both input signals to phase comparator 114 agree with each other in frequency. The oscillation frequency of VCO 118 is controlled by the signal from rotation pulse generator 98 so as to produce a relatively large integer number of pulses per one rotation of optical-disc 16 (not shown). Accordingly, rotation pulse generator 98 may be made of a simple construction because rotation pulse generator 98 need not generate large numbers of pulses per one rotation of optical-disc 16.

Figure 6:
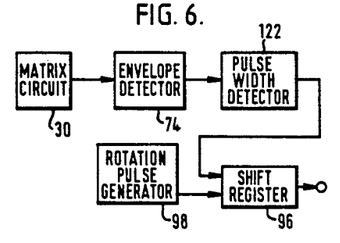

In a modification shown in FIG. 6, information dropout detecting section 44 includes an envelope detector 74, a pulse width detector 122 with its input terminal connected to envelope detector 74, and a level detector 76 with its input terminal connected to pulse width detector 122. Pulse width detector 122 yields signals responsive to the dropouts of information when the width of deformed portions of envelope waveform a (FIG. 4) exceed a predetermined width. Therefore, if the transit periods of dust or scar 80 along tracks 24a, 24b, 24c . . . 24n (FIG. 2) are shorter than the allowable period of focusing control section 32 (FIG. 1) and tracking control section 36 (FIG. 1) with high response characterictics, focusing control section 32 and tracking control section 36 are maintained with the high response characteristics condition in spite of dust or scar 80.

Figure 7:
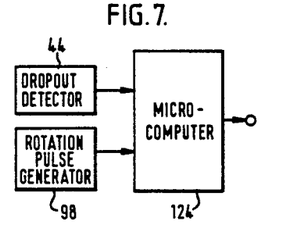

In a modification shown in FIG. 7, information dropout detecting section 44 and rotation pulse generator 98 are both connected to a microcomputer or microprocessor 124 suitably programmed. The signals responsive to the dropouts of information from information dropout detecting section 44 are stored in microcomputer 124 and shifted by pulses applied from rotation pulse generator 98.

Figure 8:
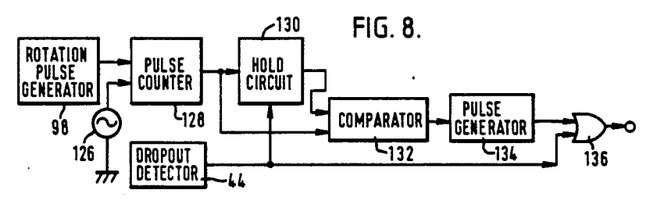

In a modification shown in FIG. 8, delay section 78 comprises a clock generator 126; a pulse counter 128 with a first input terminal connected to clock generator 126 and a second input terminal connected to rotation pulse generator 98; a hold circuit 130 with its D input terminal connected to the output terminal of pulse counter 128 and its RESET input terminal connected to information dropout detecting section 44; a comparator 132 with its one input terminal connected to hold circuit 130 and its other input terminal connected to pulse counter 128; a pulse generator 134 with its input terminal connected to comparator 132; and an OR gate 136 with its input terminals connected individually to pulse generator 134 and information dropout detecting section 44 and its output terminal connected to focusing control section 32 (FIG. 1) and tracking control section 36 (FIG. 1).

Rotation pulse generator 98 produces one pulse per one rotation of optical-disc 16. Pulse counter 128 is reset to its initial state by every pulse from rotation pulse generator 98 and then starts its operation of counting clock signals from clock generator 126. Hold circuit 130 holds the count value of pulse counter 128 when the first responsive signal Da of the signals responsive to the dropouts of information is applied from information dropout detecting section 44. The count value held in hold circuit 132 is released when the second responsive signal Db of the signals responsive to the dropouts of information is applied. The released count value from hold circuit 130 is applied to one input terminal of comparator 132 and compared with the count value from pulse counter 128. When the released count value from hold circuit 130 and the count value from pulse counter 128 agree with each other, a signal is produced by comparator 128 and applied to pulse generator 134. Pulse generator 134 then produces a pulse with a predetermined width. The pulse generated by pulse generator 134 is equivalent to delayed responsive signals d-Da, d-Db, d-Dc . . . d-Dn (FIG. 4) since the count value held in hold circuit 130 is released at the occurrence of the following responsive signal.

The pulses equivalent to delayed responsive signals d-Da, d-Db, d-Dc . . . d-Dn are applied to focusing control section 32 and tracking control section 36 through OR gate 136. Further, the first responsive signal Da is directly applied to focusing control section 32 and tracking control section 36 through OR gate 136 so that focusing control section 32 and tracking control section 36 are able to cope with the first dropout of information.

Figure 9:
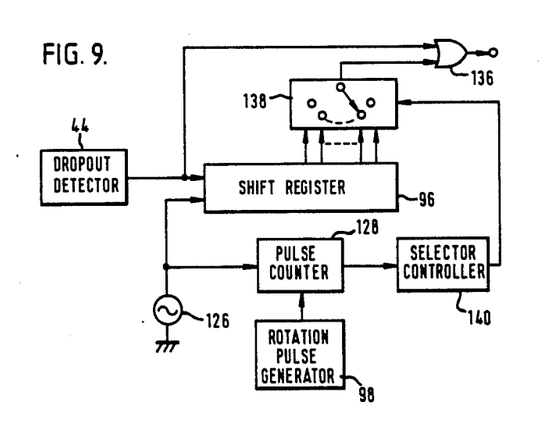

In a modification shown in FIG. 9, delay section 78 includes a multiple output shift register 96 having its D input terminal connected to dropout information detecting section 44 and its CK input terminal connected to a clock generator 126. The multiple output terminals of shift register 96 connect, individually, output terminals of register units or flip-flops in shift register 96 to corresponding selected terminals of a shift-steps selector 138. Shift-steps selector 138 has a common terminal connected to one input terminal of an OR gate 136. OR gate 136 has its other input terminal connected to dropout information detecting section 44, and its output terminal connected to focusing control section 32 (FIG. 1) and tracking control section 36 (FIG. 1). Clock generator 126 is further connected to pulse counter 128. Pulse counter 128 has a RESET input terminal connected to rotation pulse generator 98 and its output terminal connected to a control terminal of shift-steps selector 138 through a selector controller 140.

Data stored in shift register 96 is sequentially shifted by clock pulses of predetermined width delivered by clock generator 126. The clock pulses are concurrently counted in pulse counter 128. Rotation pulse generator 98 generates one pulse per one rotation of optical-disc 16. The pulses from rotation pulse generator 98 reset the count operation of pulse counter 128 to its initial state. Selector controller 140 controls the location of a select terminal in shift-steps selector 138 in response to the counting value in pulse counter 128. Thus, the select terminal location of shift-steps selector 138 is controlled such that shift-steps in shift register 96 selected by shift-steps selector 138 agree with the value counted in pulse counter 128.

Accordingly, the shift-steps in shift register 96 are varied in response to the rotation period of optical-disc 16. When optical-disc or DAD 16 is rotated at a relatively high speed or with a relatively short rotation period in order to reproduce the inner tracks thereof, the shift-steps selected are relatively small. On the other hand, when the DAD is rotated at a relatively slow speed or with a relatively long rotation period to effect reproduction of the outer tracks thereof, the shift-steps selected are relatively large. The width of the delayed pulse signals responsive to the dropouts of information from shift register 96 is maintained constant and in relation to the pulse width of the clock pulse, yet independent of the selected track location on optical-disc 16. Further, the signals responsive to the dropouts of information are directly applied to focusing control section 32 (FIG. 1) and tracking control section 36 (FIG. 1) through OR gate 136 so that focusing control section 32 and tracking control section 36 are able to cope with the first signal responsive to the dropout of information.

Figure 10:
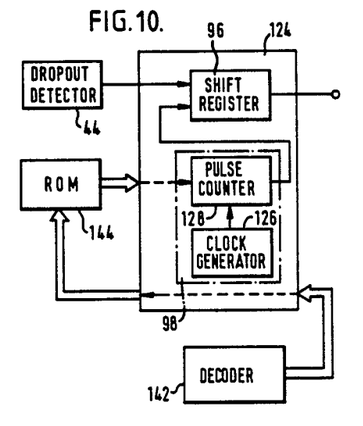
Figure 11:
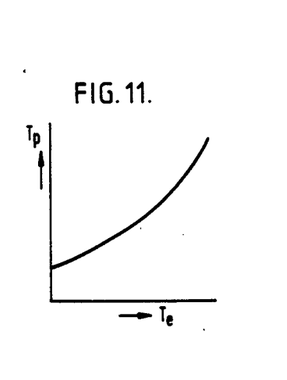
FIG. 11 is a graph showing a relationship between reproducing time elapsed and a rotation period of the optical-disc.

In a modification shown in FIG. 10, shift register 96 and rotation pulse gneerator 98 of delay circuit 78 are entirely formed in a microcomputer or microprocessor 124 suitably programmed. Rotation pulse generator 98 formed in microcomputer 124 includes clock generator 126 and pulse counter 128 with its D input terminal connected to clock generator 126 and its output terminal connected to the CK input terminal of shift register 96. Microcomputer 124 is further connected to a decoder 142, which is in turn connected to output terminal 38 (FIG. 1) for decoding the audio or video information carrying signal Sa, and to a ROM (Read Only Memory) 144.

Optical-discs, for example, DADs, include information relating to the reproduction time elapsed, together with the audio or video information. Further, the DAD is regulated to be rotated in CLV. Accordingly, the rotation period, Tp, of the DAD varies in relation to the reproduction time elapsed, Te, as shown by a graph in FIG. 11. The rotation period, Tp, of optical-disc or DAD 16 at a certain track location can therefore be obtained from the reproduction time elapsed, Te. Microcomputer 124 processes the information carrying the reproduction time elapsed, Te, from decoder 142 and applies a signal relating to the reproduction time elapsed, Te, to ROM 144. ROM 144 produces control data in response to the signal relating to the reproduction time elapsed, Te, and applies the control data to the RESET input terminal of pulse counter 128. Pulse counter 128 then produces pulses relating to the rotation period, Tp, of DAD 16 and applies the pulses to the CK input terminal of shift register 96. A count value equivalent to the pulses of rotation pulse generator 98 in FIG. 1 is applied to the CK input terminal of shift register 96 so that delayed signals responsive to the dropouts of information are obtained from the output terminal of shift register 96.

It will be apparent to those skilled in the art that various modifications and variations can be made in the scanning servo system of the present invention without departing from the scope or spirit of the invention. Thus, it is intended that the present invention cover modifications and variations of this invention provided they come within the scope of the appended claims and their equivalents.

What is claimed:

1. A scanning servo system for an optical-disc information reproducing apparatus in which information stored in an optical-disc as a series of recesses or pits arranged in concentric tracks or in a single spiral track is read out during rotation of the optical disc by a scanning spot of a light beam, said system comprising:

a light source for generating the light beam used for reading out the information as an otpical signal;
    means for applying the scanning spot of the light beam to a selected track location;
    a transducer for converting the optical signal into an electric signal;
    means for controlling said scanning spot applying means in response to the electric signal, thereby causing the scanning spot to scan the selected track location accurately, the response characteristics of said controlling means being variable in response to the electric signal;
    means for detecting a dropout of the information on the selected track location and generating a responsive signal to said dropout of information;
    means for delaying said responsive signal to said dropout of information for one rotation period of the optical-disc to anticipate a subsequent occurrence of said dropout of information;
    means for lowering the response characteristics of said controlling means in response to the delayed responsive signal to said dropout of information.

2. A scanning servo system according to claim 1, wherein said delaying means includes a register for storing said responsive signal to said dropout of information and means for detecting the one rotation period of the optical-disc and for triggering said register to output the stored responsive signal to said dropout of information after the one rotation period of the optical-disc.

3. A scanning servo system according to claim 2, wherein said register and said one rotation period detecting means are formed in a microcomputer.

4. A scanning servo system according to claim 2, further comprising means for increasing the signal width of the responsive signal to said dropout of information.

5. A scanning servo system according to claim 4, wherein said increasing means includes means connected to said one rotation period detecting means for generating an integer number of pulses, each of said pulses being of the same width and equally divided in the one rotation period of the optical-disc by the integer number, and a flip-flop having a set input connected to said transducer and a reset imput connected to said pulse generating means.

6. A scanning servo system according to claim 5, wherein said register is a shift register having shift-steps equal in number to the integer number.

7. A scanning servo system according to claim 6, further including means for changing the integer number between a small number for a relatively short period of the one rotation of the optical-disc and a large number for a relatively long period of the one rotation of the optical-disc.

8. A scanning servo system according to claim 7, wherein said one rotation period detecting means is adapted for detecting the one rotation period of the optical-disc according to a time signal relating to a reproduction time elapsed, the time signal being extracted from the information recorded in the optical-disc.

9. A scanning servo system according to claim 7, wherein said one rotation period detecting means is adapted for detecting the one rotation period of the optical-disc by detecting a rotation speed of the optical-disc.

10. A scanning servo system according to claim 7, wherein said controlling means includes an amplifier for amplifying the electric signal and an actuator for driving said scanning spot applying means by the amplified electric signal, and wherein the gain of said amplifier responsive to the response characteristics of said controlling means is lowered in response to the responsive signal to said dropout of information through said delaying means.

11. A scanning servo system according to claim 10, wherein said controlling means are further provided with a phase compensating circuit for changing the frequency-to-phase characteristics thereof in response to the gain of said amplifier.

12. A scanning servo system according to claim 10, wherein said scanning spot applying means includes means for focusing the scanning spot to the selected track location.

13. A scanning servo system according to claim 12, wherein said focusing means is an objective lens.

14. A scanning servo system according to claim 13, wherein said scanning spot controlling means includes a first actuator for driving said objective lens in a direction vertical to the optical-disc so as to focus the scanning spot at the surface of the selected track location.

15. A scanning servo system according to claim 13, wherein said scanning spot controlling means includes a second actuator for driving said objective lens in a direction radial to the optical-disc so as to move the position of the scanning spot to the selected track location.

* * * * *